US 6,641,646 B2

(12) United States Patent
Rosenberg

(10) Patent No.: US 6,641,646 B2
(45) Date of Patent: Nov. 4, 2003

(54) FILTER-CLEANING DEVICE AND METHOD, AND FLUID PULSE GENERATOR PARTICULARLY USEFUL THEREIN

(75) Inventor: Gideon Rosenberg, 20 Hana Senesh Street, 36000 Kiryat Tivon (IL)

(73) Assignees: Gideon Rosenberg, Kiryat Tivon (IL); Milow Ltd., Charleston, SC (US)

(*) Notice: Subject to any disclaimer, the term of this patent is extended or adjusted under 35 U.S.C. 154(b) by 11 days.

(21) Appl. No.: 09/958,317

(22) PCT Filed: Feb. 4, 2001

(86) PCT No.: PCT/IL01/00110
§ 371 (c)(1),
(2), (4) Date: Oct. 9, 2001

(87) PCT Pub. No.: WO01/58564
PCT Pub. Date: Aug. 16, 2001

(65) Prior Publication Data
US 2002/0157539 A1 Oct. 31, 2002

Related U.S. Application Data
(60) Provisional application No. 60/182,231, filed on Feb. 14, 2000.

(51) Int. Cl.[7] .............................................. B01D 29/52
(52) U.S. Cl. ..................... 95/280; 95/273; 55/283; 55/302; 55/419; 55/420
(58) Field of Search ................. 95/273, 280; 55/283, 55/302, 419, 420, 341.1; 220/203.01, 371; 210/102, 136, 186, 340, 341

(56) References Cited

U.S. PATENT DOCUMENTS

| | | | | |
|---|---|---|---|---|
| 2,679,320 A | * | 5/1954 | Walton | 210/102 |
| 3,394,735 A | * | 7/1968 | Wurster | 210/341 |
| 3,954,426 A | * | 5/1976 | Brange | 55/302 |
| 4,033,732 A | | 7/1977 | Axelsson et al. | |
| 4,035,295 A | * | 7/1977 | Pluequet | 210/341 |
| 4,256,583 A | | 3/1981 | Lennartz | |
| 4,624,689 A | * | 11/1986 | Volk et al. | 96/397 |
| 5,797,978 A | * | 8/1998 | Rosenberg et al. | 95/74 |
| 5,837,017 A | * | 11/1998 | Santschi et al. | 55/302 |

FOREIGN PATENT DOCUMENTS

| | | |
|---|---|---|
| EP | 0361217 A1 | 4/1990 |
| EP | 0599486 A1 | 6/1994 |
| WO | WO 91/19922 | 12/1991 |

* cited by examiner

Primary Examiner—Duane Smith
Assistant Examiner—Minh-Chau T. Pham
(74) Attorney, Agent, or Firm—G. E. Ehrlich (1995) Ltd.

(57) ABSTRACT

A filter-cleaning device and method for cleaning a filter (10) utilizing a compressible fluid pulse generator (20) including a pressure tank (21), a tank inlet (23) for inletting pressurized air or other compressible fluid, and a valve member (24) normally in a closed position closing the tank outlet (28), but being openable in a quick-action manner to produce a high-pressure high-flow impulse of fluid applied via the tank outlet to the filter outlet to back-flush the filter.

17 Claims, 3 Drawing Sheets

FILTER-CLEANING DEVICE AND METHOD, AND FLUID PULSE GENERATOR PARTICULARLY USEFUL THEREIN

RELATED APPLICATION

The present application is related to Provisional Application Ser. No. 60/182,231 filed Feb. 14, 2000, and claims the priority date of that application.

FIELD AND BACKGROUND OF THE INVENTION

The present invention relates to a cleaning device and method for cleaning air or other compressible fluid filters, and also to a compressible fluid pulse generator useful in such cleaning devices and methods. The invention is particularly useful for cleaning, by back flushing, disc-type filters such as described in U.S. Pat. Nos. 5,797,978; and 4,661,250, the disclosures in which patents are hereby incorporated by reference. The invention is therefore described below for use in cleaning such disc-type filters, but it will be appreciated that the invention could also be used for cleaning other types of filters, and also for producing high-pressure compressible fluid pulses for other applications.

Many filters generally, and disc-type filters in particular, may be cleaned by back-flushing, i.e., by introducing a pressurized fluid through the filter outlet to back-flush the filter body through the filter inlet. When the filter is used for filtering air and includes electrodes for producing an electrostatic field to enhance the filtering action as described in U.S. Pat. No. 5,797,978, the electrical connections to the electrodes may also be reversed so that the electrostatic field will repel the dirt particles from the surfaces of the filter body and thereby enhance the back-flushing of the filter body.

U.S. Pat. Nos. 4,364,751 and 4,504,293, describe other techniques for cleaning air filters, utilizing a system of tubes, valves and nozzles which generate pulses of clean air jets directed through the filter in a direction opposed to the normal air flow path. The tubes restrict the air flow so that the jets must be released successively in a time sharing cycle. Such pulse jet cleaning devices, are therefore not effective in thoroughly cleaning the filter body, and moreover are relatively expensive to produce and to maintain.

OBJECTS AND BRIEF SUMMARY OF THE INVENTION

An object of the present invention is to provide a novel filter-cleaning device which is capable of thoroughly and efficiently cleaning filters, particularly the air-type disc filters, but also other types of compressible fluid filters. Another object of the invention is to provide a method of cleaning filters; and a still further object of the invention is to provide a novel compressible fluid pulse generator particularly useful in cleaning the filters, but capable of use in other applications.

According to one aspect of the present invention, there is provided a filter-cleaning device for cleaning a filter having a filter body, a filter inlet for fluid to be filtered, and a filter outlet for the filtered fluid, the filter-cleaning device comprising: a compressible fluid pulse generator including a pressure tank, a tank inlet for inletting a compressible fluid, a tank outlet for outletting the compressed fluid, and a valve member normally in a closed position closing the tank outlet, but being actuatable to quickly move an open position to produce a high-pressure compressible fluid pulse at the tank outlet; the tank outlet being connectable to the filter outlet such that actuating the valve member applies a high-pressure high-flow impulse of the compressible fluid to the filter outlet to back-flush simultaneously the complete filter body by the high-pressure high-flow compressed fluid impulse.

According to further features in the preferred embodiment of the invention described below, the valve member is in the form of a piston movable within a cylinder in the tank; the cylinder having a closed end, and an open end aligned with the tank outlet; the piston being normally urged to its closed position to close the tank outlet by the fluid pressure within the cylinder between its closed end and the piston, and being actuatable in a fast-action manner to quickly move to its open position by the release of the pressure between the piston and the closed end of the cylinder.

According to still further features, the cylinder is formed with a large passageway therethrough adjacent its open end for directing the pressurized fluid within the tank to the tank outlet in the open position of the valve member and thereby for producing the high-pressure fluid pulse at the tank outlet. In addition, the inner diameter of the cylinder is reduced at the open end thereof aligned with the tank outlet to define an inner annular shoulder in the cylinder; and the outer diameter of the piston is correspondingly reduced at the end thereof facing the tank outlet to define: an outer annular shoulder engageable with the inner annular shoulder of the cylinder in the closed position of the piston, a large diameter section on the side of the shoulder facing the closed end of the cylinder, and a smaller diameter section on the side of the shoulder facing the open end of the cylinder The piston includes a first sealing ring on the large diameter section, and a second sealing ring on the smaller diameter section, which sealing rings are such that in the closed position of the piston, they are on opposite sides of the large passageway adjacent the open end of the cylinder.

As will be described more particularly below, such a cleaning device is particularly effective for cleaning air filters, since it produces a very quick-action opening of the valve member, and thereby produces a high-pressure high-flow impulse having a sharp front propagating in a velocity close to the speed of sound to the filter outlet which is effective to simultaneously flush all the filtering passageways of the filter. Such a cleaning device is particularly useful for producing an air blast for back-flushing air filters of the disc-type, but can be used also for back-flushing other types of filters for air or other compressible fluids, such as of the fiber type.

According to another aspect of the present invention, there is provided a compressible fluid pulse generator particularly useful for cleaning filters by back-blow flushing, but also useful for other applications requiring the generation of high-pressure fluid pulses. The invention also provides a method of cleaning filters by back-blow flushing using the novel compressible fluid pulse generator.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
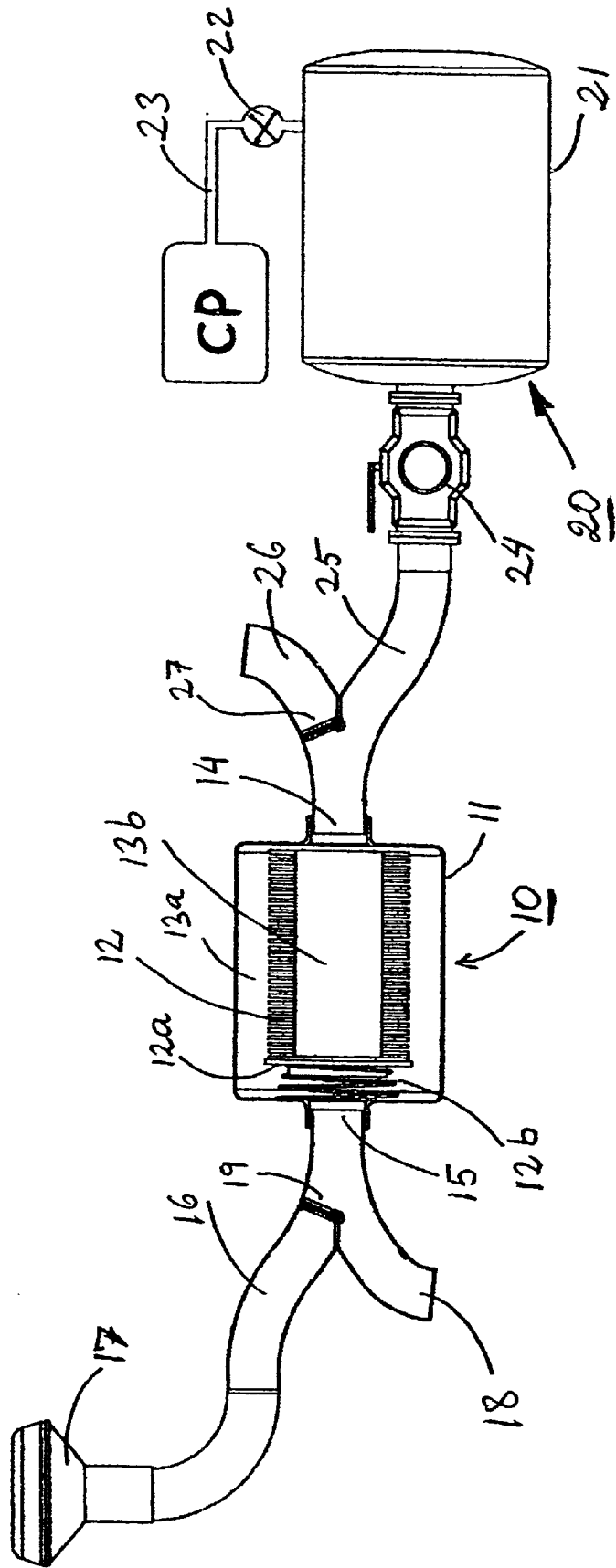
FIG. 1 illustrates one form of fluid-filtering and filter-cleaning system in accordance with the present invention.

For purposes of example, the invention is described below with respect to the disc-type air filter illustrated in U.S. Pat. No. 5,797,978, generally designated 10 in FIG. 1. Such a filter includes a housing 11 containing a filter body in the form of a stack of annular discs 12 having ribbed side faces defining a plurality of filtering paths leading from an outer passageway 13a defined by the outer edges of the discs radially inwardly to a central passageway 13b defined by the inner edges of the discs. The inner passageway is connected to an outlet 14 for the filtered air introduced via an inlet 15.

The stack of discs 12 further includes an end disc 12a at the inlet end of the stack closing the inner passageway 13b, and urged against the other discs by a spring 12b. Further details of the construction and operation of such a disc filter appear in the above-cited patents incorporated herein by reference.

The inlet 15 is in the form of a duct having one branch leading to a cyclone or other type of pre-filter 17, for directing the fluid to be filtered through the filter during a filtering operation, and a second branch 18 leading to the atmosphere for discharging cleaning air during a back-blow flushing operation, as will be described more particularly below. Inlet further includes a valve 19 for selectively connecting branch 17 to outlet 15 during a filtering operation, or branch 18 to outlet 15 for a back-blow flushing operation.

The filter outlet 14 is connected to a compressible fluid pulse generator, generally designated 20, for generating and applying a high-pressure pulse to the filter outlet 14 for back flushing the filter body 12 within the filter. The compressible fluid pulse generator 20 includes a pressure tank 21 into which pressurized air is inletted under the control of a valve 22 from a line 23 leading to a compressor CP. The generated high air pressure pulse is generated by sudden actuation of a valve 24, and is applied to one branch 25 of the fluid outlet 14 from the filter 10. The outlet 14 includes a second branch 26 leading to the utilization device to which the filtered fluid is delivered. Outlet 14 further includes a valve 27 for selectively connecting outlet 14 either to branch 25 or branch 26. Valve 24 may be controlled by a solenoid or the like (not shown) or manually.

As one example, the filter 10 may be an air filter for removing dirt particles from the air before it is delivered to a vehicle engine via branch 26. In such an application, the compressible fluid pulse generator 20 would generate a high-pressure pulse of air to be applied to the filter outlet 14 for back-flushing the filter discs 12 through the filter inlet 15 and the flushing fluid outlet 18. It will be appreciated, however, that the filter body 12 could also be a fiber filter. In this case the air impulse would be restricted not to damage the fiber material.

As will be described more particularly below, during a normal filtering mode of operation of filter 10, valve 24 is closed, valve 19 opens branch 16 of the inlet 15, and valve 27 opens branch 26 of the outlet 14, such that the filter 10 filters the air from the prefilter 17 and supplies the filtered air via branch 26 to the engine (or other utilization device); whereas during a back-blow flushing operation, valve 27 opens branch 25 of the filter outlet 14, valve 19 opens branch 18 of the filter inlet 15, and then valve 24 is opened, such that a high-pressure air impulse generated by generator 20 is applied to the outlet 14 of filter 10 to back-flush the filter discs 12 and to discharge the flushing air with the dirt through branch 18 of the inlet 15.

Figure 2:
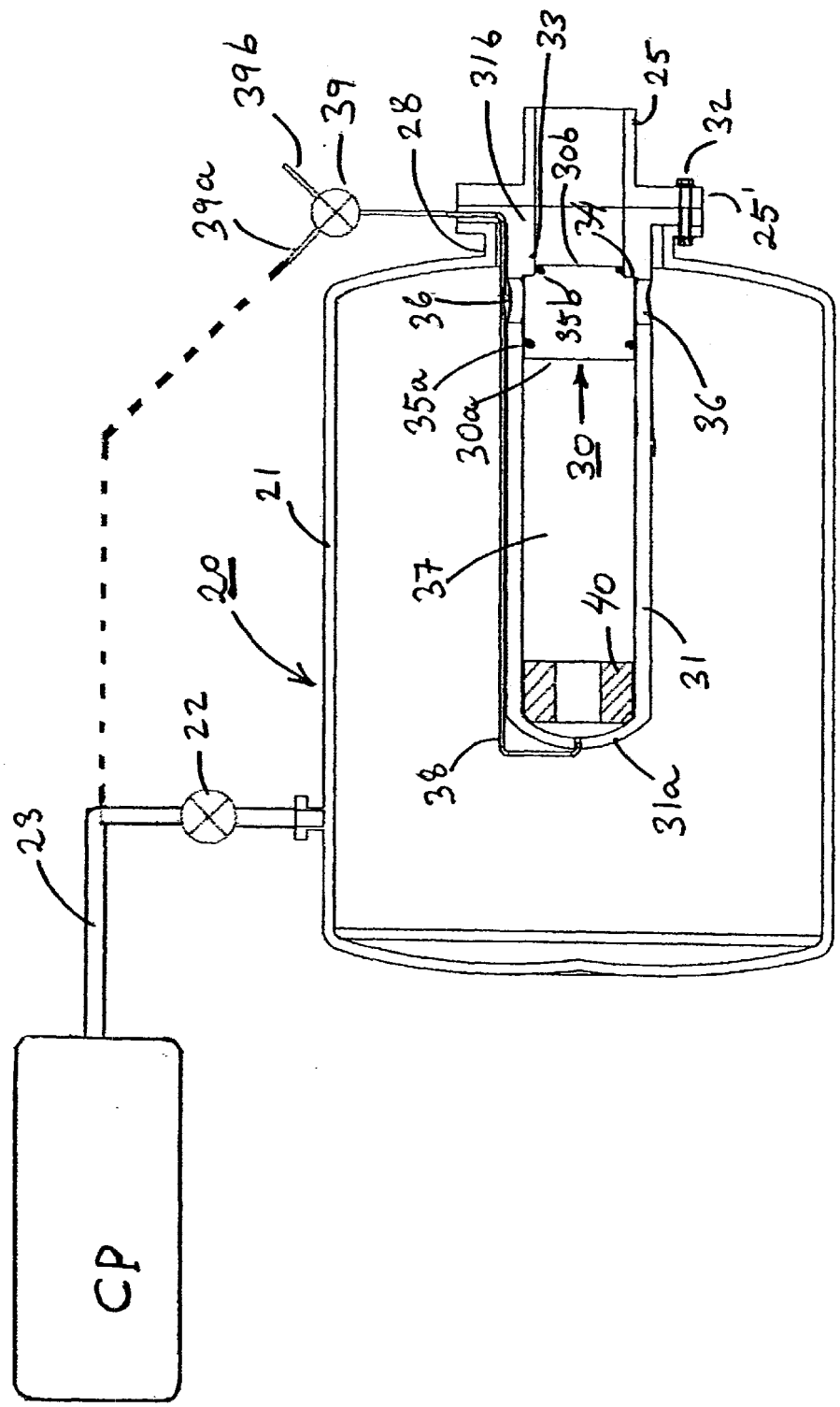
FIG. 2 illustrates another form of compressible fluid pulse generator that may be included in the system of FIG. 1.

One structure of the compressible fluid pulse generator 20 is more particularly illustrated in FIG. 2, wherein pressure tank 21 includes the valve (corresponding to valve 24) within it, and is pressurized by a compressible fluid inletted from the compressor CP under the control of valve 22 in the inlet line 23. For example, where the filter 10 is an air-cleaning filter, and the air-pulse generator 20 is used for back-blow flushing of the filter discs 12 by means of a high-pressure pulse of air, tank 21 may be pressurized with compressed air to a pressure of 5 to 10 bars.

As shown in FIG. 2, the outlet 28 of pressure tank 21 is controlled by an internal valve member rather than by external valve member 24. The internal valve member is in the form of a piston 30 movable within a cylinder 31 secured within the pressure tank 20 by fasteners 32 passing through the flanges of the tank 21, the cylinder 31, and the flange 25' of tube 25. Cylinder 31 is closed at one end 31a and is opened at its opposite end 31b received within the tank outlet 28. The inner diameter of the open end 31b of the cylinder 31 is reduced, to define an inner annular shoulder 33.

The outer diameter of the piston 30, movable within cylinder 31, is correspondingly reduced at the end thereof facing the tank outlet 28 to define an outer annular shoulder 34 engageable with the inner annular shoulder 33 of the cylinder 30. Piston 30 thus includes a large diameter section 30a on one side of its outer annular shoulder 34, and a smaller diameter section 30b on the opposite side of the shoulder A sealing ring 35a is received within an annular recess formed in the large-diameter section 30a of the piston, and a second sealing ring 35b is received within an annular recess formed in the smaller-diameter section 30b of the piston.

Cylinder 31 is in turn formed with an annular array of holes 36 through its open end, just rearwardly of its inner annular shoulder 33. The annular array of holes 36 thus define a large passageway for outletting the compressed air within tank 21 through the tank outlet 28 when the piston 30 is in its open position with respect to the open end of the cylinder 31. FIG. 2 illustrates the piston in its closed position, closing the open end of the cylinder, wherein it will be seen that sealing ring 35a is located on one side of the holes 36 to engage the inner surface of the cylinder, whereas sealing ring 35b is located on the opposite side of the hose 36 to engage the reduced-diameter section 31b of the cylinder.

Piston 30 is normally urged to its closed position illustrated in FIG. 2 by compressed air within the compartment 37 defined by the piston 30 and the closed end 31a of the cylinder. The pressure within compartment 37 is controlled by an air line 38 leading from the compartment to a pilot valve 39 selectively movable to connect compartment 37 either to the compressed air source via branch 39a, or to vent the compartment 37 to the atmosphere via branch 39b. When pilot valve 39 connects branch 39a to the compressed air source, a pressure is applied to compartment 37. Such a pressure would be sufficient to move piston 30 to its closed position illustrated in FIG. 2 since the surface area acting on the piston, as defined by the larger-diameter sealing ring 35a, is larger than the surface area acting in the reverse direction of the piston as defined by the smaller-diameter sealing ring 35b.

On the other hand, when pilot valve 39 is moved to vent compartment 37 to the atmosphere, via its branch 39b, the compressed air within tank 21 acts on the opposite face of the piston 30 to first move the piston towards its open position. As soon as seal 35b disengages from the inner surface 31b of the cylinder, the larger-diameter sealing ring 35a becomes effective to define the complete area of the piston subjected to the compressed air from tank 21, to thereby accelerate the opening movement of the piston. Such an arrangement thus produces a quick-action opening of the piston 30 as soon as the pressure within compartment 37 is reduced.

Compartment 37 may include a shock-absorbing body 40 for cushioning the fast-opening of the piston 30. Alternatively, the air flow through valve 39 can be limited so as to produce an air cushion between the closed end 31a of the cylinder and the piston 30.

It will thus be seen that the fast-opening of piston 30 produces a high-pressure pulse or blast of air from the interior of the pressure tank 21 via openings 36 through the tank outlet 28 and branch 25 of the filter outlet 14 to back-flush the filter discs 12, and to discharge the back-flushed air and dirt through branch 18 of the filter inlet 15. The fast-opening movement of piston 30 described above produces a sharp front to the so-produced high-pressure high-flow impulse, or blast, of air which travels through the complete length of the inner passageway 13b of the filter 10 at a very high speed, close to the speed of sound, taking approximately 1 ms for traversing the complete length of the passage 13. As a result, the complete passage 13 is pressurized virtually simultaneously, and therefore all the discs 12 are loaded by the same pressure wave virtually simultaneously to back-flush simultaneously the complete filter body 12. The pressure wave is reflected by the end plate 12a back towards the filter outlet 14, thereby sustaining, and even reinforcing, the pressure wave.

The duration of the so-applied pressure wave can be controlled by the volume of the tank 20 and by the air pressure inside it. It will thus be seen that the described arrangement effectively back-flushes all the filtering passages virtually simultaneously with the high-pressure air blast, and thereby more effectively cleans the filtering passageways than would be the case where there is a gradual build-up in the pressure of the air pulse supplied to the filtering passageways. Thus, where there is a more gradual build-up of the pressure wave, some of the filtering passageways would be cleaned before others, thereby decreasing the resistance to the air flow through the cleaned passageways thereby decreasing the air flow through, or even bypassing the passageways still containing dirt particles. However, where the pressure wave is quick-acting as described above, virtually all the filtering passageways are subject to the same high-pressure wave at virtually the same instant, thereby better assuring that all the filtering passageways will be efficiently cleaned by the high-pressure wave produced during the back-flushing process.

Figure 3:
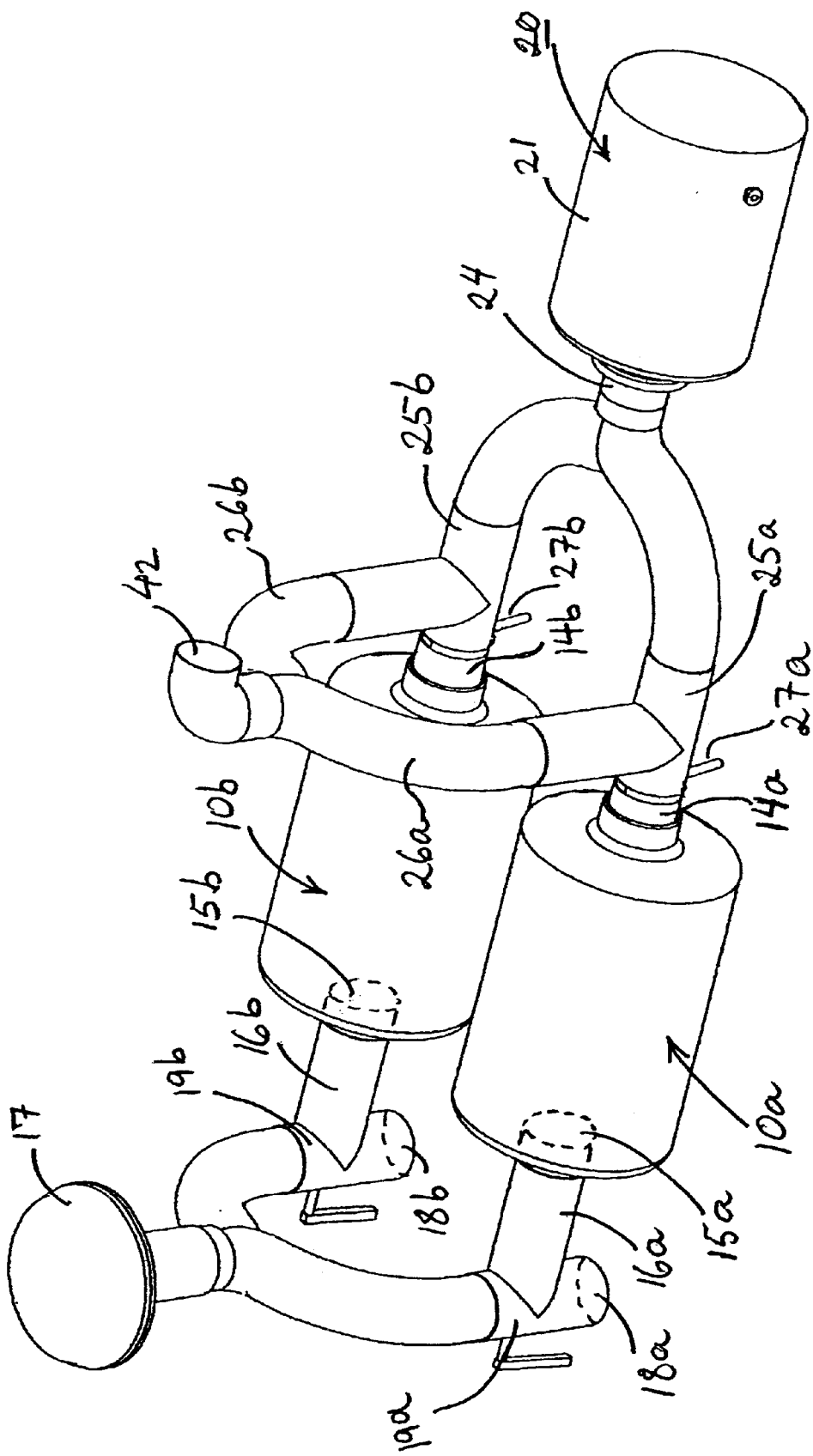
FIG. 3 illustrates a filtering system including two filters selectively cleanable by a common compressible fluid pulse generator constructed in accordance with the present invention.

FIG. 3 illustrates a system including two filters, therein designated 10a, 10b, both supplying filtered air to a utilization device, such as an engine, via a common filter outlet duct 42. The illustrated arrangement includes a common compressible fluid pulse generator 20, as described above with respect to FIGS. 1 and 2, for selectively supplying, by actuating valve 24 (or internal valve 30, FIG. 2), the high-pressure air pulses via their respective outlet ducts 25a, 25b, filter outlets 14a, 14b, and flushing fluid outlets 18a, 18b. Thus, during a normal filtering mode of operation, both of the filter inlets 16a, 16b may be supplied from the common pre-filter unit 17 by controlling their respective inlet valve 19a, 19b and outlet valves 27a, 27b, to deliver filtered air via their filtered air outlets 26a, 26b to the common outlet duct 42. When one of the filter units 10a, 10b is to be cleaned by a back-flushing operation, its respective inlet valve 19a, 19b would be set to connect the respective inlet 15a, 15b to the respective flushing outlet 18a, 18b; and similarly, the respective valve 27a, 27b, would be set to apply the high-pressure air pulse from generator 20 to the respective branch 25a, 25b of the respective filter outlet 14a, 14b to back-flush the filter via its inlet branch 18a, 18b.

While the invention has been described with respect to one preferred embodiment, it will be appreciated that this is set forth merely for purposes of example, and that many modifications and other applications of the invention may be made. For example, the invention could be used for back flushing other types of filters, such as fiber filters for air and other gases. Many other variations, modifications and applications of the invention will be apparent.

What is claimed is:

1. A filter-cleaning device for cleaning a filter having a filter body, a filter inlet for fluid to be filtered, and a filter outlet for the filtered fluid, said filter-cleaning device comprising:

a compressible fluid pulse generator including a pressure tank, a tank inlet for inletting a compressible fluid, a tank outlet for outletting the compressed fluid, and a valve member normally in a closed position closing said tank outlet, but being actuatable to quickly move to an open position to produce a high-pressure compressible fluid pulse at said tank outlet;

said tank outlet being connectable to said filter outlet such that actuating said valve member applies a high-pressure high-flow impulse of the compressible fluid pulse that propagates into said filter outlet to back-flush simultaneously the complete filter body by the high-pressure high-flow compressible fluid impulse;

said valve member being in the form of a piston movable within a cylinder in said tank;

said cylinder having a closed end, and an open end aligned with said tank outlet;

said piston being normally urged to its closed position to close said tank outlet by the compressible fluid pressure within the cylinder between its closed end and the piston, and being actuatable in a fast-action manner to quickly move to its open position by the release of said pressure between the piston and the closed end of the cylinder.

2. The device according to claim 1, wherein said cylinder is formed with a large passageway therethrough adjacent its open end for directing the pressurized fluid within the tank to the tank outlet in the open position of the valve member and thereby for producing the high-pressure high-flow impulse of compressible fluid at the tank outlet.

3. The device according to claim 2, wherein:

the inner diameter of the cylinder is reduced at the open end thereof aligned with said tank outlet to define an inner annular shoulder in the cylinder;

and the outer diameter of the piston is correspondingly reduced at the end thereof facing the tank outlet to define: an outer annular shoulder engageable with the inner annular shoulder of the cylinder in the closed position of the piston, a large diameter section on the side of said shoulder facing the closed end of the cylinder, and a smaller diameter section on the side of said shoulder facing the open end of the cylinder;

said piston including a first sealing ring on said large diameter section, and a second sealing ring on said smaller diameter section, said sealing rings being located such that in the closed position of the piston, they are on opposite sides of said large passageway adjacent the open end of the cylinder.

4. The device according to claim 2, wherein said large passageway adjacent the open end of the cylinder is constituted of an annular array of holes formed through the cylinder adjacent its open end.

5. The device according to claim 1, wherein said piston is actuatable from its closed position to its open position by a pilot valve which releases the fluid pressure between the piston and the closed end of the cylinder.

6. The device according to claim 1, wherein the closed end of the cylinder includes a shock absorbing body engageable by the piston when actuated to its open position.

7. The device according to claim 1, wherein said compressible fluid pulse generator generates air pulses.

8. The combination of a device according to claim 1, and a filter including a filter body, a filter inlet for the fluid to be filtered, and a filter outlet for the filtered fluid; said filter outlet being connected to said tank outlet of the fluid pulse generator.

9. The combination according to claim 8, wherein said filter body includes a stack of annular discs having outer edges defining an outer passageway through the filter, inner edges defining a central passageway through the filter, and side faces formed with ribs defining filtering paths between the two passageways.

10. The combination according to claim 9, wherein said filter inlet faces the outer edges of said annular discs, and said filter outlet faces the inner edges of said discs; said filter further including an end disc at the inlet end of said stack of discs, which end disc is effective to receive said high-pressure fluid pulse applied through said central passageway via the filter outlet, and to reflect it back to the filter outlet.

11. The combination according to claim 8, wherein said filter outlet includes a duct having a first branch for delivering the filter fluid to a utilization device, a second branch connected to said tank outlet of the fluid pulse generator, and a valve for selectively connecting said duct to said first branch or to said second branch.

12. The combination according to claim 11, wherein said filter inlet includes a duct having a first branch for receiving the fluid to be filtered, a second branch for discharging the flushing fluid, and a valve for selectively connecting said latter duct to said first branch or to said second branch.

13. The combination according to claim 12, wherein there are two filters supplying the filtered fluid to a utilization device, said filters being selectively connectable to a common compressible fluid pulse generator such that each filter may be selectively controlled to perform a filtering operation while the other filter is subjected to a back-flushing operation.

14. A compressible fluid pulse generator comprising:

a pressure tank having a tank inlet for inletting a pressurized fluid, a tank outlet for outletting the pressurized fluid, and a valve member normally in a closed position closing said tank outlet, but actuatable to quickly move to an open position to produce a high-pressure high-flow impulse of compressible fluid at said tank outlet;

said valve member being in the form of a piston movable within a cylinder in said tank;

said cylinder having a closed end, and an open end aligned with said tank outlet;

said piston being normally urged to its closed position to close said tank outlet by the fluid pressure within the cylinder between its closed end and the piston, and being actuatable in a fast-action manner to quickly move to its open position by the release of said pressure between the piston and the closed end of the cylinder;

said cylinder being formed with a large passageway therethrough adjacent its open end for directing the pressurized fluid within the tank to the tank outlet in the open position of the valve member and thereby for producing the high-pressure high-flow impulse of compressible fluid at the tank outlet;

the inner diameter of the cylinder being reduced at the open end thereof aligned with said tank outlet to define an inner annular shoulder in the cylinder;

the outer diameter of the piston being correspondingly reduced at the end thereof facing the tank outlet to define: an outer annular shoulder engageable with the inner annular shoulder of the cylinder in the closed position of the piston, a large diameter section on the side of said shoulder facing the closed end of the cylinder, and a smaller diameter section on the side of said shoulder facing the open end of the cylinder;

said piston including a first sealing ring on said large diameter section, and a second sealing ring on said smaller diameter section, said sealing rings being located such that in the closed position of the piston, they are on opposite sides of said large passageway adjacent the open end of the cylinder.

15. The fluid pulse generator according to claim 14, wherein said large passageway adjacent the open end of the cylinder is constituted of an annular array of holes formed through the cylinder adjacent its open end.

16. The fluid pulse generator according to claim 14, wherein said piston is actuatable from its closed position to its open position by a pilot valve which releases the fluid pressure between the piston and the closed end of the cylinder.

17. The fluid pulse generator according to claim 14, wherein the closed end of the cylinder includes a shock absorbing body engageable by the piston when actuated to its open position.

* * * * *